(12) United States Patent
Finlay et al.

(10) Patent No.: US 7,974,968 B2
(45) Date of Patent: *Jul. 5, 2011

(54) DIRECT CALL THREADED CODE

(75) Inventors: Ian R. Finlay, Uxbridge (CA); Douglas James Doole, Don Mills (CA)

(73) Assignee: International Business Machines Corporation, Armonk, NY (US)

(*) Notice: Subject to any disclaimer, the term of this patent is extended or adjusted under 35 U.S.C. 154(b) by 516 days.

This patent is subject to a terminal disclaimer.

(21) Appl. No.: 12/116,071

(22) Filed: May 6, 2008

(65) Prior Publication Data

US 2008/0208799 A1    Aug. 28, 2008

Related U.S. Application Data

(63) Continuation of application No. 09/628,599, filed on Jul. 28, 2000, now Pat. No. 7,392,245.

(30) Foreign Application Priority Data

Jul. 30, 1999  (CA) .................................. 2279222

(51) Int. Cl.
G06F 7/00      (2006.01)
G06F 17/30     (2006.01)

(52) U.S. Cl. ........ 707/713; 707/716; 707/718; 717/128; 717/129; 717/140; 717/141

(58) Field of Classification Search .................. 707/713, 707/716, 718; 717/128, 129, 140, 141
See application file for complete search history.

(56) References Cited

U.S. PATENT DOCUMENTS

| 5,274,820 | A |   | 12/1993 | Gillet |            |
|-----------|---|---|---------|--------|------------|
| 5,379,419 | A |   | 1/1995  | Heffernan et al. | |
| 5,386,557 | A | * | 1/1995  | Boykin et al. | 707/999.001 |
| 5,396,622 | A | * | 3/1995  | Lee et al. | 707/999.007 |
| 5,481,708 | A |   | 1/1996  | Kukol  |            |
| 5,548,758 | A |   | 8/1996  | Pirahesh et al. | |
| 5,577,241 | A |   | 11/1996 | Spencer |           |
| 5,584,026 | A |   | 12/1996 | Knudsen et al. | |
| 5,619,692 | A |   | 4/1997  | Malkemus et al. | |
| 5,682,535 | A |   | 10/1997 | Knudsen |           |
| 5,761,653 | A |   | 6/1998  | Schiefer et al. | |
| 5,778,354 | A | * | 7/1998  | Leslie et al. | 707/999.002 |
| 5,822,750 | A |   | 10/1998 | Jou et al. |       |
| 5,867,712 | A | * | 2/1999  | Shaw et al. | 717/140 |
| 5,875,334 | A | * | 2/1999  | Chow et al. | 717/141 |
| 6,014,674 | A |   | 1/2000  | McCargar |         |
| 6,077,312 | A |   | 6/2000  | Bates et al. |      |

(Continued)

OTHER PUBLICATIONS

Carey et al.—"The Architecture of the EXODUS Extensible DBMS"—Proceddings on the 1986 International Workshop on Ojbect-Oriented Database Systems (OODS'86) IEEE computer Society Press, Los Alamitos, CA USA 1986 (pp. 52-65).*

(Continued)

Primary Examiner — John Breene
Assistant Examiner — Anh Ly
(74) Attorney, Agent, or Firm — Kunzler Needham Massey & Thorpe

(57) ABSTRACT

A pre-pass and direct call mechanism which replaces the interpreter. The mechanism moves static decisions out of the repeated runtime path, into a pre-pass operation. Advantageously, the mechanism reduces runtime overhead, and improves overall performance of the DBMS during runtime, while maintaining the considerable investment in opcode generation and plan representation, already invested in the implementation of the DBMS.

10 Claims, 4 Drawing Sheets

U.S. PATENT DOCUMENTS

| | | |
|---|---|---|
| 6,105,033 A | 8/2000 | Levine |
| 6,112,210 A | 8/2000 | Nori et al. |
| 6,138,112 A | 10/2000 | Slutz |
| 6,151,598 A | 11/2000 | Shaw et al. |
| 6,256,784 B1 | 7/2001 | Grove |
| 6,321,274 B1 | 11/2001 | Shakib et al. |
| 6,339,841 B1 | 1/2002 | Merrick et al. |
| 6,341,288 B1 | 1/2002 | Yach et al. |
| 6,349,297 B1 | 2/2002 | Shaw et al. |
| 6,353,820 B1 * | 3/2002 | Edwards et al. ............. 707/713 |
| 6,424,989 B1 | 7/2002 | Shaw et al. |
| 6,438,536 B1 | 8/2002 | Edwards et al. |
| 6,453,314 B1 | 9/2002 | Chan et al. |
| 6,484,312 B1 | 11/2002 | Morrison |
| 6,636,846 B1 | 10/2003 | Leung et al. |
| 7,020,854 B2 | 3/2006 | Killian et al. |
| 7,085,751 B2 * | 8/2006 | Finlay et al. .................. 707/718 |
| 7,200,842 B1 * | 4/2007 | Susser et al. .................. 717/159 |
| 2002/0010798 A1 * | 1/2002 | Ben-Shaul et al. ........... 709/247 |
| 2002/0147969 A1 | 10/2002 | Lethin et al. |

OTHER PUBLICATIONS

Navin Kabra and David J. DeWitt—"OPT++: An Object-Oriented Implementation for Extensible Database Query Optimization"—The VLDB Journaal 1998, (pp. 55-78).*

* cited by examiner

Translation of Opcode to Function Pointer

DIRECT CALL THREADED CODE

CROSS-REFERENCES TO RELATED APPLICATIONS

This application is a continuation of and claims priority to U.S. patent application Ser. No. 09/628,599 entitled "Direct Call Threaded Code" and filed Jul. 28, 2000, now U.S. Pat. No.: 7,392,245 for Ian R. Finlay, and to Canadian Patent Application No. 2,279,222 filed Jul. 30, 1999 both of which are incorporated herein by reference.

FIELD OF THE INVENTION

The present invention relates to relational database management systems, and more particularly to a method for optimizing execution of queries in a relational database management system.

BACKGROUND OF THE INVENTION

A database management system (DBMS) comprises the combination of an appropriate computer, direct access storage devices (DASD) or disk drives, and database management software. A relational database management system is a DBMS which uses relational techniques for storing and retrieving information. The relational database management system or RDBMS, such as the DB2 product from IBM, comprises computerized information storage and retrieval systems in which data is stored on disk drives or DASD for semi-permanent storage. The data is stored in the form of tables which comprise rows and columns. Each row or tuple has one or more columns.

The RDBMS is designed to accept commands to store, retrieve, and delete data. One widely used and well-known set of commands is based on the Structured Query Language or SQL. The term query refers to a set of commands in SQL for retrieving data from the RDBMS. The definitions of SQL provide that a RDBMS should respond to a particular query with a particular set of data given a specified database content. SQL however does not specify the actual method to find the requested information in the tables on the disk drives. There are many ways in which a query can be processed and each consumes a different amount of processor and input/output access time. The method in which the query is processed, i.e. query execution plan, affects the overall time for retrieving the data. The time taken to retrieve data can be critical to the operation of the database. It is therefore important to select a method for finding the data requested in a RDBMS which minimizes the computer and disk access time, thereby optimizing the cost of doing the query.

To execute a SQL statement, such as "select * from t1", in a RDBMS program like DB2 the statement is presented to the SQL optimizer. The SQL optimizer parses, tokenizes and semantically analyzes the statement, transforming it into the Query Graph Model (QGM) representation of the statement. The QGM representation is then processed to perform a number of heuristic optimizations. The output of this pass is then fed to the cost-based planning stage. The cost-based planning stage processes the optimized QGM, producing an access plan, based on LOw LEvel Plan OPerators (LOLEPOPs). The plan produced by the cost-based optimizer is then processed by a Code Generation module (CODGEN) to produce an OPeration Code (OPCODE) based access plan, which can be processed at runtime by a Relational Database System (RDS).

In prior versions of RDBMS programs, such as DB2 (Versions 5.2 and older), the OPCODE based access plan is interpreted at runtime by the Relational Database System (RDS). The Relational Database System examines each OPCODE, and looks up the function which is called to process the OPCODE and its operands. The processing for the OPCODE includes loading the OPCODE's operands and making decisions based on information associated with the OPCODE that was provided at CODGEN time. These decisions are made repeatedly, each time the OPCODE processing function is called, and direct the function of the OPCODE. An alternative implementation involved producing multiple OPCODEs for these similar functions. This approach still results in considerable duplication in underlying OPCODE processing.

It will be appreciated that one of the principle problems with existing RDBMS programs, such as the DB2 product, is the fact that the RDBMS includes an interpreter which executes during runtime. Since the interpreter translates and runs the OPCODE's at the same time, operation during runtime is considerably slower than for a compiler based implementation. In view of the costs associate with replacing existing interpreter-based RDBMS programs, there remains a need for a mechanism which can improve the slower runtime performance of the interpreter phase in such systems.

BRIEF SUMMARY OF THE INVENTION

The present invention provides a pre-pass and direct call mechanism which replaces the interpreter phase. The mechanism moves static decisions out of the repeated runtime path, into a pre-pass operation. Advantageously, the mechanism reduces runtime overhead, and improves overall performance of the DBMS during runtime, while maintaining the considerable investment in opcode generation and plan representation, already invested in the implementation of the DBMS.

The pre-pass mechanism according to the present invention replaces the repeated looking up of the function to call to process the OPCODE and the function's operands, and any decisions that need to be made repeatedly (i.e. static decisions), during the interpreter phase of execution. The pre-pass mechanism comprises a pre-processing function which replaces or augments the OPCODE, and any static decisions, with a pointer to the function to call to perform the operation specified by the OPCODE, or a pointer to an intermediate function with an auxiliary data structure, or a pointer to an auxiliary data structure, wherein the auxiliary data structure includes a pointer to the function to call to perform the operation specified by the OPCODE. Advantageously, the pointers are called without additional lookup. The intermediate function to call to perform the function specified by the OPCODE may include processing operations and static decision making.

In a first aspect, the present invention provides a method for pre-processing an access plan generated for a query in a relational database management system, the access plan includes a plurality of operation codes and is stored in memory, each of the operation codes is associated with one or more executable functions for performing the query, the method comprising the steps of: (a) retrieving the access plan from memory; (b) determining an executable function associated with the first operation code in the access plan; (c) augmenting the operation code in the access plan with a pointer to the executable function; (d) repeating steps (b) and (c) for the remaining operation codes in the access plan; (e) storing the modified access plan in memory.

In a second aspect, the present invention provides a relational database management system for use with a computer system wherein queries are entered by a user for retrieving data from tables, the relational database management system includes a query optimizer for generating an access plan associated with the queries entered by the user, the relational database management system comprises: (a) means for retrieving the access plan generated for a query from memory; (b) means for determining an executable function associated with each of the operation codes in the access plan; (c) means for augmenting the operation code in the access plan with a pointer to the associated executable function; (d) means for storing the modified access plan in memory.

In another aspect, the present invention provides a computer program product for use on a computer wherein queries are entered by a user for retrieving data in a relational database management system having a query optimizer for generating an access plan for executing the query, the computer program product comprises: a recording medium; means recorded on the medium for instructing the computer to perform the steps of, (a) retrieving the access plan from memory; (b) determining an executable function associated with the first operation code in the access plan; (c) augmenting the operation code in the access plan with a pointer to the executable function; (d) repeating steps (b) and (c) for the remaining operation codes in the access plan; (e) storing the modified access plan in memory.

BRIEF DESCRIPTION OF THE DRAWINGS

Reference will now be made to the accompanying drawings which show, by way of example, preferred embodiments of the present invention, and in which.

DETAILED DESCRIPTION OF THE PREFERRED EMBODIMENTS

Figure 1:
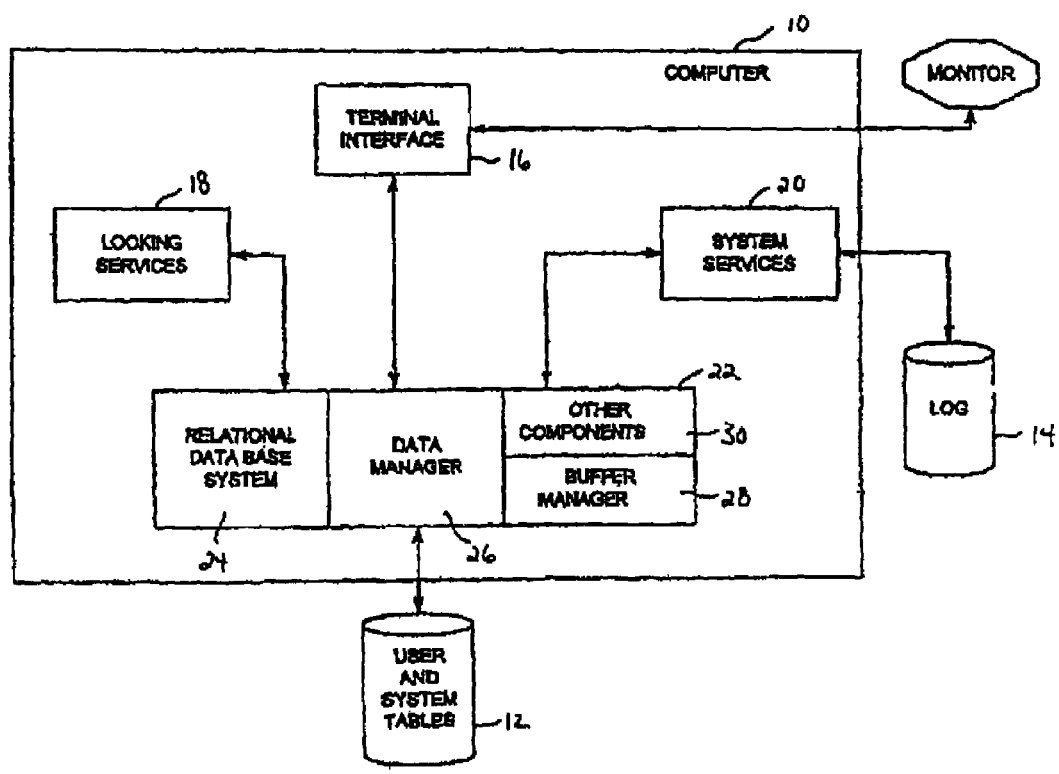
FIG. 1 shows in diagrammatic form a computer system for the present invention.

Reference is first made to FIG. 1 which shows an exemplary computer system 10 which is suitable for use with the present invention. As shown in FIG. 1, the computer system 10 comprises one or more processors connected to one or more electronic storage devices 12 and 14, such as disk drives, that store one or more relational databases. Users of the computer system 10 use a standard operator interface 16, such as OS/2 or other similar interface, to input commands for performing various search and retrieval functions, termed queries, against the databases. In the context of the present invention, these queries conform to the Structured Query Language (SQL) standard, and invoke functions performed by a Relational Database Management System (RDBMS). In the preferred embodiment of the present invention, the RDBMS software comprises the DB2 product offered by IBM for the MVS or OS/2 operating systems. Those skilled in the art will however recognize that the present invention has application to any RDBMS program that utilizes SQL.

As shown in FIG. 1, the DB2 architecture for the MVS operating system includes three major components: an IMS Resource Lock Manager (IRLM) 18, a System Services module 20, and a Database Services module 22. The IRLM 18 handles locking services because DB2 treats data as a shared resource, thereby allowing any number of users to access the same data simultaneously. As a consequence, concurrency control is required to isolate users and to maintain data integrity. The System Services module 20 controls the overall DB2 program execution environment, which includes managing log data sets 14, gathering statistics, handling startup and shutdown, and providing management support.

At the center of the DB2 architecture is the Database Services module 22. The Database Services module 22 contains several sub-modules, including the Relational Database System (RDS) 24, the Data Manager 26, and other components such as a SQL compiler. These sub-modules support the functions of the SQL language, i.e. definition, access control, retrieval, and update of user and system data.

Figure 2:
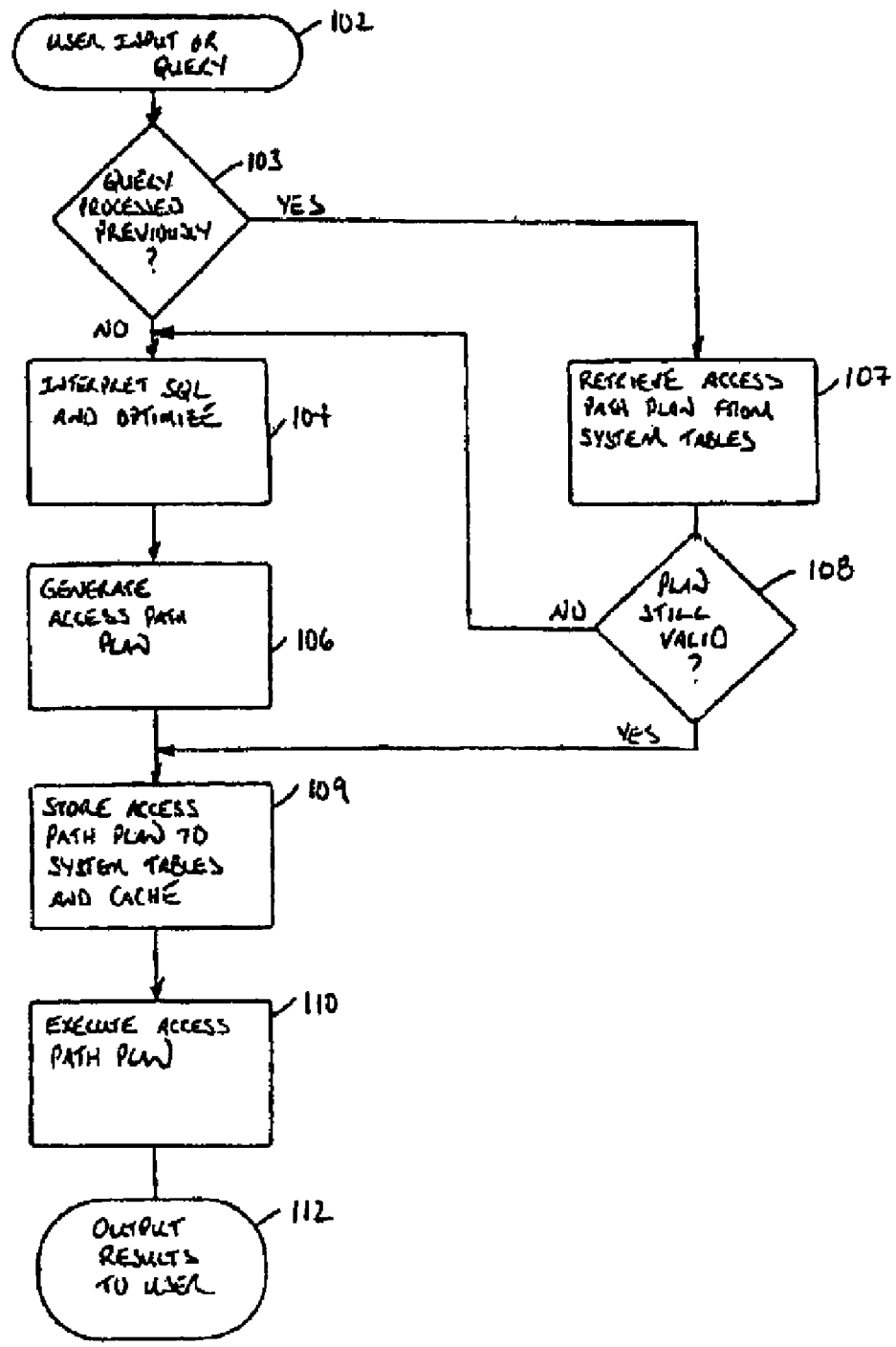
FIG. 2 shows in flowchart form the steps for the interpretation and execution of SQL statements in the context of the present invention.

Reference is next made to FIG. 2 which shows in flowchart form the steps for the interpretation and execution of SQL statements in the context of the present invention. Block 102 represents the input by the user of SQL statements into the computer system 10. Block 103 represents the step of checking to determine if the RDBMS has previously processed the SQL statements input by the user. If the SQL statements have already been processed, then the access path plan is retrieved in Block 107 and processed as described below. If SQL statements have not been processed, then processing is performed starting at Block 104. Block 104 represents the step of compiling or interpreting the SQL statements. Block 106 represents the step of generating a compiled set of runtime structures called an execution or access path plan from the compiled SQL statements. Generally, the SQL statements received as inputs from the user specify only the data that the user wants, but not how to get it. This step considers both the available access paths (i.e. indexes, sequential reads, etc.) and system held statistics on the data to be accessed (i.e. the size of the table, the number of distinct values in a particular column, etc.) to choose what it considers to be the most efficient access path for the query. Block 109 represents the step performed in the Access Plan Manager (included in the RDBMS 24—FIG. 1) for storing the access path plan (as generated through Block 106) into a system table which allows future re-use of the access path plan. If the SQL statements (i.e. query) was previously processed (as determined in block 103), then the access path plan is retrieved from the system tables as indicated by Block 107. Block 108 represents the step of determining if the access path plan is still valid. In Block 108, the Access Plan Manager examines the retrieved access path plan to ensure that the plan is still valid, i.e. all indexes, tables, etc. still exist in the RDBMS. If the access path plan is not valid, then a new access path plan needs to be generated starting at Block 104 (as described above). If the access path plan is valid, then the next step in Block 109 involves storing the access path plan in the system tables. The access path plan is also stored in a memory cache as indicated in Block 109. Block 110 represents the execution of the application plan. A pre-pass function according to present invention within block 110 improves runtime performance as will be described below. Block 112 represents the output of the results of the application or access path plan to the user.

In prior art systems as described above, the application or access plan is generated by a cost-based optimizer and then processed by a Code Generation module (included in other components 22 shown in FIG. 1) to produce an Operation Code (OPCODE) access plan. The OPCODE access plan is then stored in the main memory cache for the computer system 10. To execute the SQL statement (block 110), i.e. the access plan, according to the prior art, the computer system 10 would first retrieve the section of code from the memory cache. An instruction pointer (IP) is initialized to point to the first entry in the list of operations, or OPCODE's, that describe what is to be done to execute the SQL statement. The Relational Database System (RDS) uses the OPCODE to look up a corresponding function (F) in a look-up table. The look-up table contains the mapping of every opcode supported by the database engine 26 to the executable function that performs the operation associated with the opcode. Next the function (F) is called by the RDS to apply the function as required. A "return" code is also returned along with a next instruction pointer (IPNxt). The return code indicates whether execution is to stop or continue, and the next instruction pointer (IPNxt) points to the next operation that is to be executed now that the current operation is complete. The return code typically indicates STOP if the SQL request had been completed. It will be appreciated that with this prior art approach, the OPCODE may be looked up and executed multiple times in the course of processing an SQL request. Repeated execution is further compounded by nested SQL requests.

According to the present invention, a pre-pass function or mechanism is included in block 110. The pre-pass function pre-processes the access path plan for the SQL statement before storage in the memory cache. The pre-processing comprises looking up the OPCODE's to determine the corresponding function to execute with each opcode. The opcode is replaced or augmented with a pointer to the function to call to perform the operation specified by the OPCODE. The pre-processing further includes an examination of the function and runtime environment to determine more precisely which function best suits the operation being requested for the SQL statement.

According to another aspect of the pre-pass mechanism, an intermediate processing function may be inserted either during this pre-pass stage, or at a later processing stage, to provide additional, auxiliary processing capabilities. The pointer to the function to call to process the operation specified by the OPCODE is replaced by a pointer to the intermediate processing function and an auxiliary data structure. The auxiliary data structure includes a pointer to store the pointer to the function to call to process the operation specified by the OPCODE. The intermediate function provides the capability to perform additional, auxiliary processing such as gathering statistics on the function which process the operation specified by the OPCODE, or requesting input from a user via the terminal interface 16, before or after calling the function to process the operation specified by the OPCODE. According to another aspect, the pointer to the function to call to process the operation specified by the OPCODE is augmented with another pointer to the auxiliary data structure.

Figure 3:
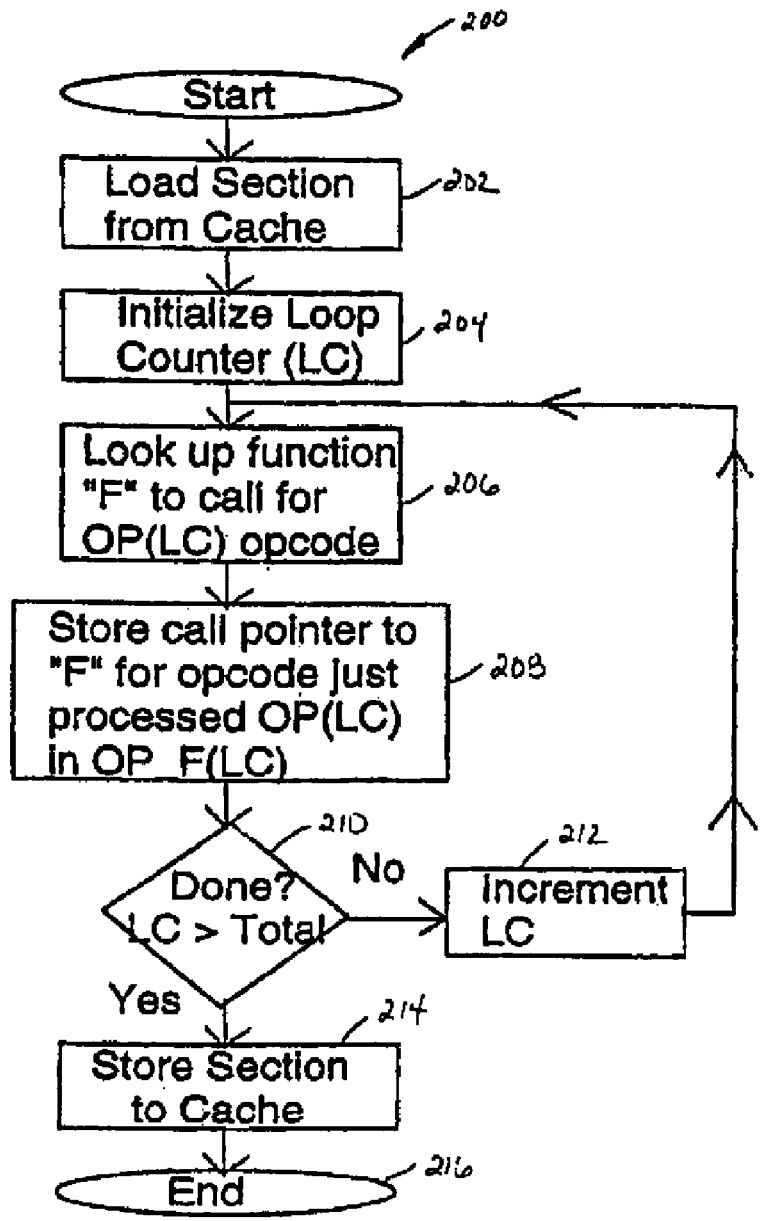
FIG. 3 shows in flowchart form the steps for translating opcode to function pointers according to the present invention.

Reference is made to FIG. 3 which shows in flowchart form the steps for performing a pre-pass function according to the present invention indicated generally by reference 200. The pre-pass function is performed by the Access Plan Manager (APM) in the RDBMS 24 (FIG. 1) prior to storing the access path plan into the memory cache, but after storing the unaltered access path plan in the system tables. This allows for future reuse of the access path plan should the user input the same SQL statements at a later time. Block 202 represents the first step in the pre-pass function and involves loading the code section from the memory cache. Block 204 represents the step of initializing a loop counter LC to 1 for looping through all of the OPCODE's in the code section. Block 206 represents the steps of looking up the function F corresponding to the OPCODE being referenced by the loop counter LC. In addition, the function is examined to determine if a more specific function can be used to process this request. If a more specific function exists, it is selected to replace the function F.

Block 208 represents the step of storing a call pointer to the function F for the OPCODE being referenced by the loop counter LC. Alternatively, block 208 may also include steps for storing a call pointer to an intermediate processing function, an auxiliary data structure, wherein the auxiliary data structure includes a call pointer to the function F for the OPCODE being referenced by the loop counter LC. The call pointer is stored in a function pointer OP_F(LC) and is indexed by the current value of the loop counter LC which corresponds to the OPCODE being currently processed. Block 210 represents a decision step which checks the loop counter LC to determine if all the OPCODE's in the code section have been processed. If all the OPCODE's have not been processed, then the loop counter LC is incremented in block 212 and the steps in blocks 206 to 210 are repeated for the remaining OPCODE's. Once all the OPCODE's are processed, the processed code section is stored in the memory cache (Block 214) and the pre-pass function 200 ends (Block 216). The processed code section includes the function pointers corresponding to the OPCODE's previously stored in the code section, and the code section is ready for execution.

Figure 4:
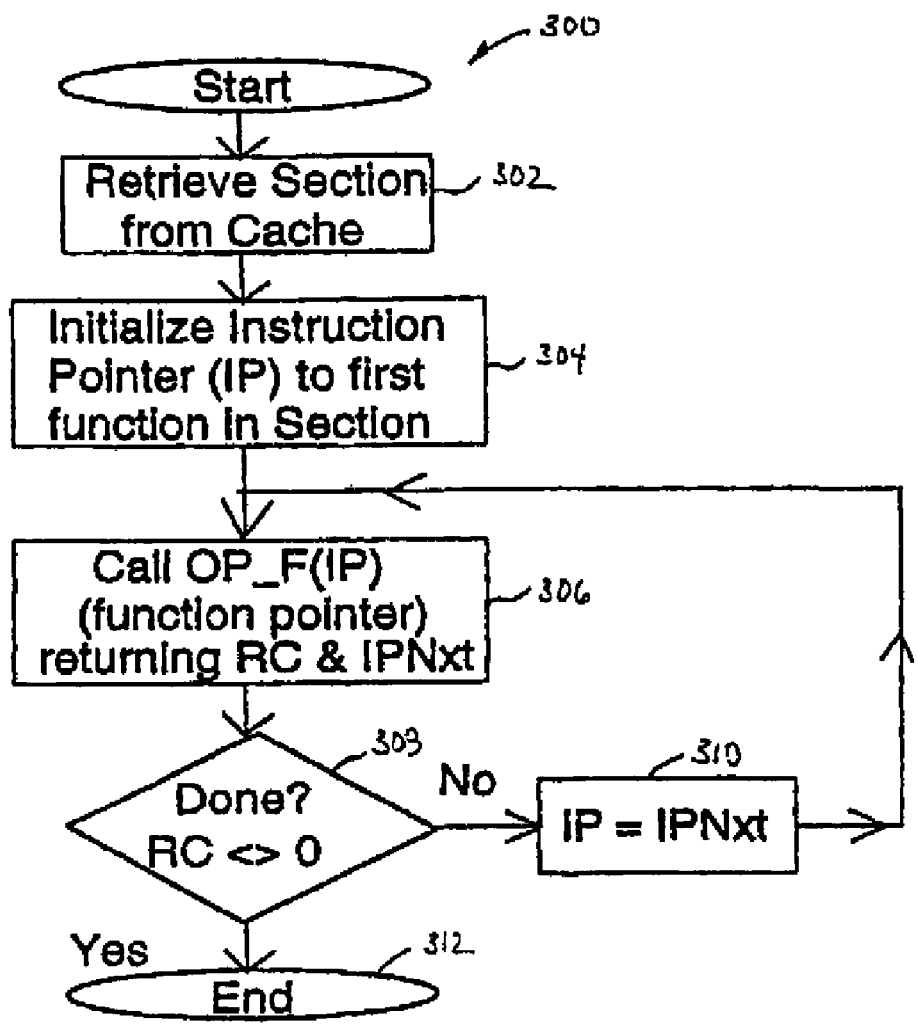
FIG. 4 shows in flowchart form the steps for execution of the translated opcode according to the present invention.

Reference is next made to FIG. 4, which shows the sequence of steps for executing a SQL request which has been processed by the pre-pass function 200 (FIG. 3). As shown in FIG. 4, Block 302 represents the first step which involves retrieving the processed code section from the memory cache. Block 304 represents the step of initializing an instruction pointer IP to point to the first function entry in the code section. Block 306 represents the step of the RDS calling the function that is being referenced by the function pointer that is pointed to by the instruction pointer OP_F(IP) to execute the function being referenced. In addition, a return code RC and a next instruction pointer IPNxt are returned in Block 306. The return code RC indicates whether to stop or continue, and the next instruction pointer IPNxt indicates the next function pointer that is to be called now that the current function has been executed. Block 308 represents the step of checking if the return code RC indicates STOP. The return code RC indicates STOP if the SQL request has been completed. If not completed, the instruction pointer IP is set to the value of the next instruction pointer IPNxt and the steps in Blocks 306 to 308 are repeated.

It will be appreciated that the pre-pass mechanism according to the present invention replaces the need for the repeated looking up of the function to call in order to process the OPCODE and its operands. The pre-pass mechanism also replaces any decisions that need to be made repeatedly (i.e. static decisions). The look up operation to the function is replaced with a pointer to the function, whereas static decisions are replaced by pre-processing operation(s).

There are a number of processing options that can be performed with the pre-pass mechanism. For example, the RDS in the current version of DB2 has a save/restore that is always performed for all new subroutines that start up. These operations are not always required, as the information they save is not always affected by the operations that are performed within a section. The save/restore operations can be moved into entry/exit routines, that are then tacked on to the start and end of the subroutine, thus saving considerable overhead for sections that are repeatedly called, and that do not require the save/restore. As described above, static decisions may also be moved into a pre-processing function, allowing the removal of 'if-then-else' decisions from the normal runtime path. This is particularly beneficial for decisions that are included due to the general nature of some operands, but that rarely are used. Removing such decisions from being made repeatedly offers significant performance improvements for such operations.

An example of such a decision is code page translation for string operations. Although operands are often in the same code page, it is still necessary to confirm this, but it need only be confirmed once. If the operands are in the same code page, then a more optimal string operator may be called, otherwise, a more general string operator, which takes into account dissimilar code pages, must be called. Similar conditions exist for predicates, and mathematical operators, where optimal functions may be called to handle like-to-like operands, in place of the general operators which handle dissimilar operands.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer program product for use on a computer wherein queries are entered by a user for retrieving data in a relational database management system having a query optimizer for generating an access plan for executing the query, said computer program product comprising:
 a recording medium;
 means recorded on said medium for instructing said computer to perform the steps of,
 (a) retrieving the access plan from memory;
 (b) determining an executable function associated with the first operation code in the access plan;
 (c) augmenting said operation code in the access plan with a pointer to an intermediate processing function and an auxiliary data structure storing a pointer to said executable function;
 (d) repeating steps (b) and (c) for the remaining operation codes in the access plan;
 (e) storing the modified access plan in memory.

2. The computer program product as claimed in claim 1, wherein said auxiliary data structure includes means for storing information associated with said executable function and said operation code.

3. The computer program product as claimed in claim 1, wherein said step (c) comprises augmenting said operation code in the access plan with another pointer to said auxiliary data structure, said auxiliary data structure providing means for storing information associated with said operation code and said executable function.

4. The computer program product as claimed in claim 1, wherein said step (b) further includes assessing the executable function associated with the operation code and replacing the call to the executable function with a call to another executable function.

5. The computer program product as claimed in claim 1, wherein said intermediate processing function includes processing operations the executable function associated with the operation code.

6. The computer program product as claimed in claim 5, wherein said processing operations in the intermediate processing function include gathering statistics on the use of the executable function associated with the operation code.

7. The computer program product as claimed in claim 1, wherein said processing operations in the intermediate processing function include a pause for receiving user input before the call to the executable function.

8. A relational database management system for use with a computer system wherein queries are entered by a user for retrieving data from tables, the relational database management system including a query optimizer for generating an access plan associated with the queries entered by the user, said relational database management system comprising:
 (a) means for retrieving the access plan generated for a query from memory;
 (b) means for determining an executable function associated with each of said operation codes in the access plan;
 (c) means for augmenting said operation code in the access plan with a pointer to an intermediate processing function and an auxiliary data structure storing a pointer to said associated executable function;
 (d) means for storing the modified access plan in memory.

9. The relational database management system as claimed in claim 8, wherein said auxiliary data structure includes means for storing information associated with said executable function an said operation code.

10. The relational database management system as claimed in claim 8, wherein said means for augmenting said operation code includes means for adding another pointer to said auxiliary data structure, said auxiliary data structure providing means for storing information associated with said operation code and said executable function.

* * * * *